3,326,845
POLYESTER-AGGREGATE COMPOSITIONS AND METHOD OF MAKING
Henrietta A. Arens and Francis E. Arens, both of 425 Cornelia St., North Mankato, Minn. 56001
No Drawing. Filed Oct. 26, 1962, Ser. No. 233,438
2 Claims. (Cl. 260—40)

This invention relates to compositions which are thermosetting and to a method of making the same.

It is an important object of the invention to provide a polyester-aggregate composition which is unusually strong and durable though utilizing a minimum amount of polyester resin material in the composition.

Another object of the invention is to provide a composition of the class described which has a high degree of decorative quality both in its natural molded state and in a cut or split condition.

A further object of the invention is to provide a thermosetting composition and method which utilizes polyester resin and inert aggregate so selected as to make an effiicient, inexpensive and strong product which is useful in the structural and decorative arts.

The compositions of this invention comprise a mixture of a polyester material with a coarse aggregate and a finally powdered material set into a dense form which may be broken along a predetermined plane or may be removably molded in a form or be cast in situ for such purposes as patching, coating and the like.

The process by which the composition is made requires inert materials, one of which is a powder of such a particle size as to be capable of coating or dusting upon the surfaces of others which constitute aggregate particles. The aggregate particles and the powder must be properly prepared and mixed prior to the addition of the polyester resin, which is then intermixed therewith, molded and cured.

The compositions of this invention are characterized by their strength, durability and pleasing appearance. When masses of the composition are made in accordance with the teachings hereof, and sections of the masses are deliberately broken by application of high forces, the inert material will cleave rather than pull loose at interfaces. Such cleavage is random and will occur even when an aggregate such as granite or agate is employed. Thus, while structural strength is an important object, natural stones and pebbles may be selected for their unusual color and markings and may be proportioned for decorative effects in the raw broken surface of the composition or in combinations of cut and polished surfaces.

In the selection of the aggregate component, the particles should be clean and dry and there should be no deleterious chemical reaction with the polyester resin binding material when mixed therewith. It has been found that any aggregate of ordinary stone or crushed rock can be used effectively. Generally speaking, the aggregate sizes will vary from that of course sand up to pebble or crushed rock sizes such as are employed for ordinary concrete mixes. It will be understood, however, that aggregate sizes beyond those indicated can be effectively employed for special purposes. It is advisable to oven dry the aggregate since moisture from humid air as well as crystalline and adsorbed moisture can affect the strength and curing characteristics of the composition even though the aggregate may have the appearance of being dry.

An essential step in the making of the composition is the pre-coating of the aggregate particles with a dry and inert dusting material. The dusting material can be made from siliceous substance or even from inert chemical powders and mixtures thereof. Here again, it is preferred that the dusting powder be carefully dried to render it virtually free of all moisture. The dusting material is caused to cling to substantially the entire surface areas of the aggregate particles and hence the quantity employed is best selected so as to completely coat the particles without providing any appreciable excess of the powder. It has been found that the powder can be produced from such widely variant materials as Portland cement, finely ground silica, calcium carbonate and calcium sulphate. The powder need not be of uniform grind but should be fine enough to cling to the surfaces of the aggregate. The powder can thus usefully range from a particle size of about $10^{-5}$ to $10^{-2}$ inches in average diameter. Portland cement in its commercially ground state functions well if maintained in a dry condition. While an excess of the powder is not harmful to the composition, a greater amount of resin will be required to saturate the aggregate and powder. While the mechanism of forming the composition is not fully understood, it is recognized that the surface of the aggregate must be wet with the uncured resin and the powder must be saturated at the same time. Therefore, the sequence of treatment becomes very important. By utilizing an amount of inert and dry powder which will just thoroughly coat the aggregate, and by carrying out this step prior to the addition of the resin, it has been found that a structurally strong cured composition can be obtained with as little as 10 percent of the resin binder material. Since the cost of the resin is many times that of the inert components, a significant advance has thus been made in the art of commercially feasible resin-based structural compositions. At the same time, compositions can be made according to the instant disclosure, the strength of which substantially exceeds that of conventional concrete.

In the selection of polyester resins for the instant invention, a large number of dicarboxylic acids can be esterified in various combinations with dihydroxy alcohols to produce a prepolymer. Either or both of the acid and diol components may be unsaturated to some degree so that the appropriate cross linking can occur with the addition of a vinyl compound to the prepolymer. Suitable catalysts and accelerators well known to the art can be employed to control the curing time of the composition.

By way of example the following dibasic acids can be successfully employed in the production of a prepolymer for use in the compositions of this invention: Glutaric, succinic, hexamethylenedicarboxylic, oxalic, carbonic, maleic, fumaric, muconic, dihydromuconic, citraconic, mesaconic, itaconic, phthalic, tetrachlorophthalic, isophthalic, terephthalic, adipic, subacic, pimelic, endomethylenetetrahydrophthalic and hexachlorendomethylenetetraydrophthalic.

Also by way of example the following dihydroxy alcohols can be used in such combinations with the acid component which will yield a prepolymer having some degree of unsaturation for purposes of subsequent polymerization and cross linking: Glycols including ethylene, trimethylene, neopentyl, propylene, tetramethylene, decamethylene, diethylene, dipropylene, triethylene, tripropylene, tetraethylene and tetrapropylene. Further dihydroxy alcohols within the contemplation of the invention are pentaerythritol; 2,5-dimethyl-3-hexyne-2,5-diol; 3,6-dimethyl-4-octyne-3,6-diol; 2-butene-1,4-diol.

The cross-linking agent may be any compound having vinyl unsaturation which can be polymerized, for example, diallyl phthalate; triallyl cyanurate; diallyl bicyclo (2,2,1)-hept-5-ene-2,3-dicarboxylate; divinylbenzene and styrene.

Standard catalyzing and accelerating procedures can be utilized for controlling the setting and curing times. Thus, cobalt octoate, cobalt naphthenate, methyl ethyl ketone peroxide, and methyl phthalate in small quantities constitute useful compounds of the class described.

In each of the examples cited herein, the aggregate was dried and dusted with the dry inert powder by tumbling or shaking until substantially complete coverage of all aggregate surfaces with powder was achieved. While no strong adherent effect exists between the powder and the aggregate, the coverage once obtained, continues since as much of the powder as becomes dislodged from any given minute area on an aggregate particle will become replaced by other quantities of the small excess of powder during the dusting operation. Mixing of the prepolymer with the coated aggregate was done in ordinary manner, avoiding prolonged and unduly vigorous handling.

In all of the following examples, a plain coarse sand aggregate was employed, the aggregate being washed free of organic material and being thoroughly dried prior to the making of the samples. Representative ester prepolymers were formed substantially on a mole equivalent basis with a slight excess of the diol. Various dusting agents and several examples of varying proportions of the components demonstrate a consistently strong product having a compressive strength in excess of that of commercial concrete. Standard catalyzing techniques under uniform conditions were employed to polymerize and cross link the resin and the resulting samples were tested to determine the pressure required to break the sample. All of the components are expressed in parts and are on a weight basis.

*Example I*

| | |
|---|---|
| Aggregate | 70.6 |
| Calcium carbonate (particle size $4 \times 10^{-4}$ inches) | 17.6 |
| Resin (polyester of maleic acid and dipropylene glycol cross-linked with 40 percent vinyl toluene in the resin) | 11.8 |
| | 100.0 |

Compressive strength 9,790 p.s.i.

*Example II*

| | |
|---|---|
| Aggregate | 70.5 |
| Silica (particle size $3 \times 10^{-3}$ inches) | 11.8 |
| Resin (polyester of maleic acid and dipropylene glycol cross-linked with 40 percent vinyl toluene in the resin) | 17.7 |
| | 100.0 |

Compressive strength 8,960 p.s.i.

*Example III*

| | |
|---|---|
| Aggregate | 77.4 |
| Portland cement (particle size $1.5 \times 10^{-3}$ inches) | 12.9 |
| Resin (polyester of maleic anhydride and trimethylene glycol cross-linked with 40 percent styrene) | 9.7 |
| | 100.0 |

Compressive strength 6,720 p.s.i.

*Example IV*

| | |
|---|---|
| Aggregate | 74.1 |
| Calcium carbonate and calcium sulphate mixture (particle size $1.4 \times 10^{-3}$ inches) | 14.8 |
| Resin (polyester of mixture of fumaric and phthalic acids and ethylene glycol cross-linked with 40 percent styrene) | 11.1 |
| | 100.0 |

Compressive strength 9,530 p.s.i.

*Example V*

| | |
|---|---|
| Aggregate | 77.4 |
| Calcium carbonate and calcium sulphate mixture (particle size $1.4 \times 10^{-3}$ inches) | 12.9 |
| Resin (polyester of maleic acid and dipropylene glycol cross-linked with 40 percent vinyl toluene) | 9.7 |
| | 100.0 |

Compressive strength 8,810 p.s.i.

Whereas it is a general practice under prior art teachings to employ at least 40 percent of polyester resins of the class described in thermosetting compositions, we have been able to successfully employ an unusually low percentage of resin in our composition. Under the present invention, and, to the best of our knowledge, by utilizing any combination of fluid cross-linking and polymerizable esters of the class described we have found that the dusting of the inert powder on the surfaces of the aggregate makes it possible to use a sparing amount of resin to achieve both an inexpensive and strong product.

It is to be understood that the particular form of product described herein and the particular procedure set forth are presented for purposes of explanation and illustration and that various modifications of said product and procedure can be made without departing from our invention as defined in the claims presented herewith.

What is claimed is:
1. The method of using a composition for molding, surfacing and patching which comprises:
   (a) dusting a layer of inert and dry finely divided particulate solid substance having a size of between about $10^{-2}$ inches and $10^{-5}$ inches upon inert and dry solid aggregate particles so as to completely cover the surfaces thereof,
   (b) mixing a prepolymer ester of a dibasic acid and a diol with a vinyl cross-linking agent to form a fluid binder, the dibasic acid being selected from the group consisting of glutaric, succinic, hexamethylenedicarboxylic, oxalic, carbonic, maleic, fumaric, muconic, dihydromuconic, citraconic, mesaconic, itaconic, phthalic, tetrachlorophthalic, isophthalic, terephthalic, adipic, subacic, pimelic, endomethylenetetrahydrophthalic and hexachloroendomethylenetetrahydrophthalic acids, the diol being selected from the group consisting of the glycols of ethylene, trimethylene, neopentyl, propylene, tetramethylene, decamethylene, diethylene, dipropylene, triethylene, tripropylene tetraethylene, tetrapropylene, and pentaerythritol; 2,5-dimethyl-3-hexyne-2,5-diol; 3,6-dimethyl-4-octyne-3,6-diol; and 2-butene-1,4-diol,
   (c) then intermixing the dusted aggregate particles with said fluid binder to form an intermixed composition containing between about 10 and 18 parts by weight fluid binder, 70 to 77 parts dry aggregate, and 12 to 18 parts of said particulate solid substance, and
   (d) then compacting the intermixed composition in place and treating the composition to cure said resin binder.
2. The method as set forth in claim 1 being particularly characterized in that said cross-linking agent is selected from the class consisting of diallyl phthalate; triallyl cyanurate; diallyl bicyclo (2,2,1)-hept-5-ene-2,3-dicarboxylate; divinylbenzene and styrene.

References Cited

UNITED STATES PATENTS 3,078,249  2/1963  Russell _____ 260—40

MORRIS LIEBMAN, *Primary Examiner.*

A. H. KOECKERT, J. FROME, *Assistant Examiners.*